United States Patent
Ramisa Navarro

(10) Patent No.: US 6,655,916 B2
(45) Date of Patent: Dec. 2, 2003

(54) SYSTEM FOR HARNESSING WIND ENERGY WITH SELF-PROTECTION

(76) Inventor: Josep Ramisa Navarro, C/ San Alberto Magno 8-10 Sobre Atico Segunda, Esplugas de Llobregat, Barcelona (ES), 08950

( * ) Notice: Subject to any disclaimer, the term of this patent is extended or adjusted under 35 U.S.C. 154(b) by 0 days.

(21) Appl. No.: 10/003,409

(22) Filed: Dec. 6, 2001

(65) Prior Publication Data

US 2002/0071757 A1 Jun. 13, 2002

(30) Foreign Application Priority Data

Dec. 7, 2000 (ES) .......................................... 200002936

(51) Int. Cl.[7] .................................................. F03D 7/06
(52) U.S. Cl. ...................................... 416/117; 132/142
(58) Field of Search .......................... 416/117, 132 A, 416/132 B, 17, 188–89, 118–119, 143, 142

(56) References Cited

U.S. PATENT DOCUMENTS

| 215,035 | A | * | 5/1879 | Alden | |
|---|---|---|---|---|---|
| 802,144 | A | * | 10/1905 | Harrington | |
| 2,596,726 | A | * | 5/1952 | Rydell | |
| 4,178,126 | A | * | 12/1979 | Weed | 416/17 |
| 4,208,168 | A | * | 6/1980 | Chen et al. | 416/132 B |
| 4,293,274 | A | * | 10/1981 | Gilman | 416/51 |
| 4,303,835 | A | * | 12/1981 | Bair | 290/55 |
| 4,342,539 | A | * | 8/1982 | Potter | 416/9 |
| 4,348,154 | A | * | 9/1982 | Ducker | 416/104 |
| 5,784,978 | A | * | 7/1998 | Saiz | 114/103 |

FOREIGN PATENT DOCUMENTS

EP 000050891 A1 * 5/1982 ................. 416/117

* cited by examiner

Primary Examiner—Edward K. Look
Assistant Examiner—J. M. McAleenan
(74) Attorney, Agent, or Firm—Jacobson Holman PLLC

(57) ABSTRACT

System for harnessing wind energy with self-protection that includes a vertical shaft assembled with bearings on the rotating core. The core is equipped with a gear converting movement into energy. The core carries radial pieces in which there is an upper base that supports an ascending vertical shaft terminating in a discoid piece. The radial pieces carry internal shafts with bevel gears connected to the bevel gears assembled on vertical shafts mounted on blocks at the ends of the arms. The shafts carry ball joints, from which the extensions of the ascending shaft extend, provided with a crossbar with the pulleys provided with ties. The ties include elastic springs that fasten the double blades with the ties to the ascending shaft making it possible for the blades to become wound around it. This occurs when the assembly rotates in the opposite direction.

3 Claims, 3 Drawing Sheets

SYSTEM FOR HARNESSING WIND ENERGY WITH SELF-PROTECTION

Figure 1:
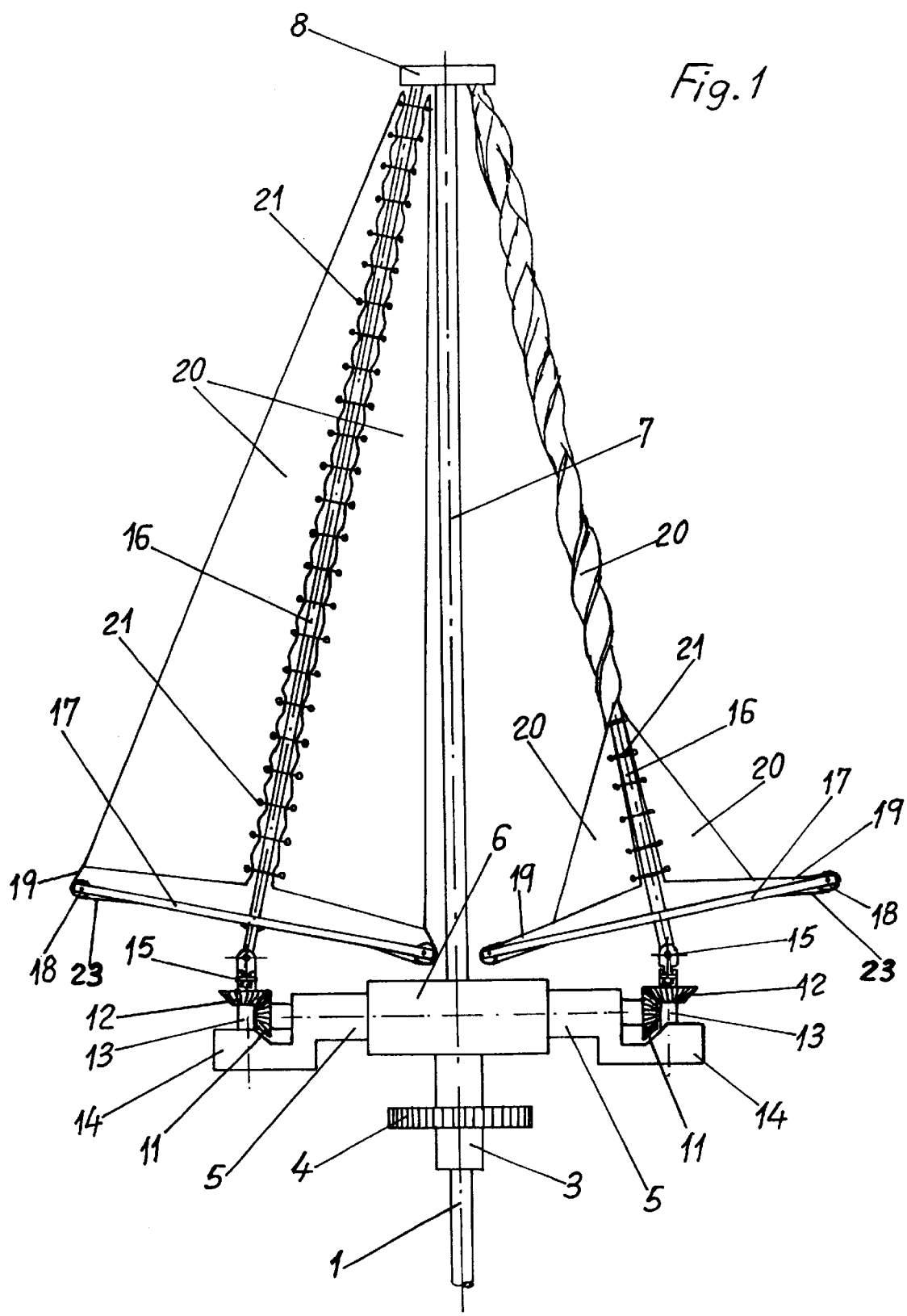

The invention to which we are referring in the body of this descriptive report, and with assistance of the supplementary drawings attached hereto, concerns a new system for harnessing wind energy with self-protection that constitutes an evident novelty within the field of natural energy production without pollutants, achieving a perfect driving function without any danger whatsoever of breakdowns or breakage, given the safety devices incorporated in it, offering the advantage that, in the event of hurricane-force winds, storms or tempests, the overall assembly of mechanisms is equipped with means of automatic action, through which, this wind system sets a safety mechanism into motion, through sensors or any other kind of automatic activating device, whereby a motor coupled to it, or some other means, reverses the direction of the rotating assembly, thus achieving a folding action by means of the winding of the blades or elements in the form of triangular sails around the shaft, with the wind generator remaining momentarily without movement, presenting structural and constitutive characteristics that differ noticeably from all of the wind generators known at the present time, such reasons, together with the qualities of novelty and practical usefulness, being those which provide a sufficient basis for obtaining the privilege of exclusivity applied for, with a view to its manufacture and sale by the proprietor in Spain, as a consequence of this Patent registration.

The earlier technique takes into consideration the existence of various mechanisms and generators of wind action, generally provided with rotating blades in the form of a windmill, also with the existence of models equipped with blades that drive a horizontal shaft in the form of arms, with variable shapes and numbers of arms driven by the wind, in addition to a range of mechanisms with sheets that drive a vertical shaft, such sheets being able to adopt a spiral form, cups, turbines, sails or any other indeterminate form, while all of the known systems involve a number of drawbacks such as breakage and breakdowns on account of a lack of protection, while the system harnessing the wind energy concerned in this registration avoids all of the aforesaid problems, as it is equipped with an assembly that rotates in its entirety around a central vertical shaft, designed on its upper plane of rotation with supports distributed peripherally, double triangular blades on both sides of the ascending support, with the triangular blades adopting the form of sails that can be wound around the supports themselves, such action coming about when a reverse rotation occurs on account of the effect of hurricane-force winds, storms or adverse weather situations, with the rotation in reverse being produced automatically through sensors or other elements, thus avoiding possible breakdowns or breakage in the mechanisms of the wind energy harnessing system concerning us here.

Essentially, the wind energy harnessing system with self-protection to which we are referring has a central shaft arranged vertically, on which a rotating set of mechanisms is assembled, which in turn, at several points of its periphery, incorporates triangular blades, each of which is made up of two halves affixed to ascending bars or supports which, on their upper end are assembled with the possibility of moving around the central shaft in the proper direction of rotation, while in the opposite direction of rotation, a rotation of the ascending bar supporting the double triangular blades will occur, in such a way that these, in the shape of sails, will wind around the bar, thus avoiding the violent action of the wind, with each ascending bar or support of the blades carrying a bevel gear transmission on their lower portion, which acts to transmit the turning motion of the core of the central block with the entire rotor equipped with a transmission that converts the movement into energy.

The triangular blades acting in the manner of sails have ties on their lower ends, assembled around small pulleys attached to the two ends of crossbars mounted by means of free bearings on the ascending supports, terminating the ties, being fitted with springs or some other elastic elements, which, on being stretched taut, achieve the proper winding of the blades around their support, in order to later facilitate their unfolding, while the ties are designed with guide elements, preventing them from slipping off when passing over the pulleys.

The bevel gears of the transmissions are all the same, that is, they have the same number of teeth, while the central bevel gear, integrated with the lower vertical shaft, has exactly half of the number of teeth as the bevel gears situated on the vertical shafts of the ends of the radial transmission pieces.

The vertical shafts comprising the lower extension of the supports of the blades, with the bevel pinions and relevant joints, are fixed to the crossbars supporting the folding blades underneath, with the entire assembly being anchored by means of bearings to the upper extensions of the support of the triangular blades divided into two halves, at their respective ends and, by means of ball joints, they are affixed and housed by means of small vertical shafts inside the upper disk with which the central shaft is terminated, acting in order to bring about rotation in the opposite direction, in the event of strong winds, such as in hurricanes or adverse weather conditions, in the same way as the lower central rotating core will be suspended from a support fastened to the ground by bearings.

For a better understanding of the general characteristics set out above, drawings are included to graphically illustrate through diagrams an example of a practical implementation of the system for harnessing wind energy with self-protection concerning us here, noting that, given the eminently informative nature of the drawings in question, the figures designed in them must be examined from a broad perspective and without a restrictive interpretation of any kind.

The figures designed in the attached drawings are explained below:

FIG. 1. General view of the system for harnessing wind energy, showing the arrangement of the double triangular folding blades in the shape of sails, the triangular blades of which will be assembled on ascending bars or supports that are affixed on the upper ends of their respective shafts to the top of the fixed central shaft, while below, the ascending bars themselves sustaining the double triangular blades have a crossbar which, on its two ends, carries elastic anchoring devices with pulleys that fasten the unfolded sails, with all of the support bars of the triangular blades being finished off on their respective lower ends by means of bevel gears, through which the rotation of the force generated is converted into useable energy.

Figure 2:
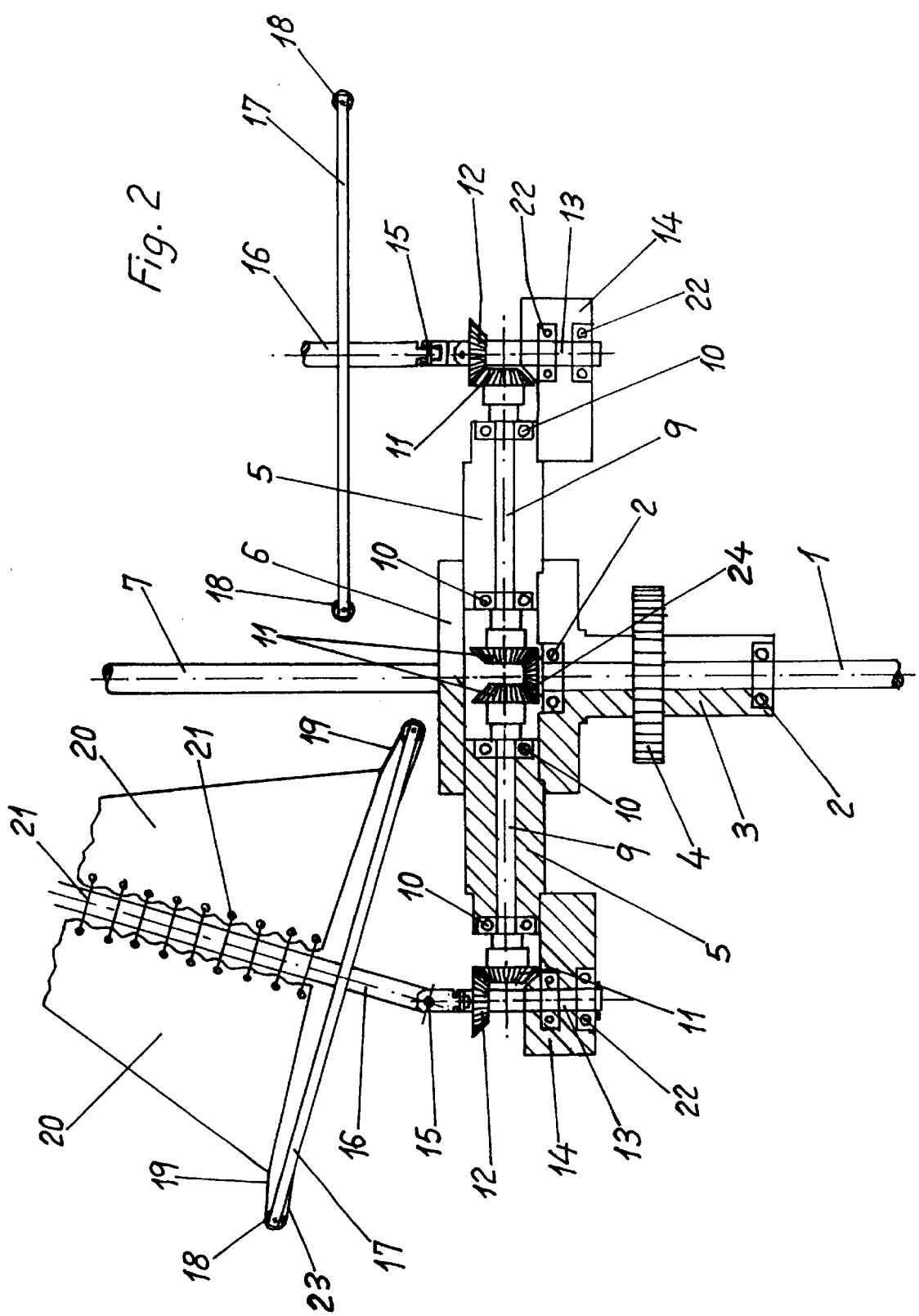

FIG. 2. Detailed front view and cross section of the assembly of mechanisms comprised by sets of equal radial bevel gears to a rotating core, equipped with a transmission to a bevel gear with half of the number of teeth, through which the energy is obtained, while the assembly carries several blades in an equidistant arrangement which cross in their rotating movement without interfering with each other, thus achieving maximum effectiveness.

Figure 3:
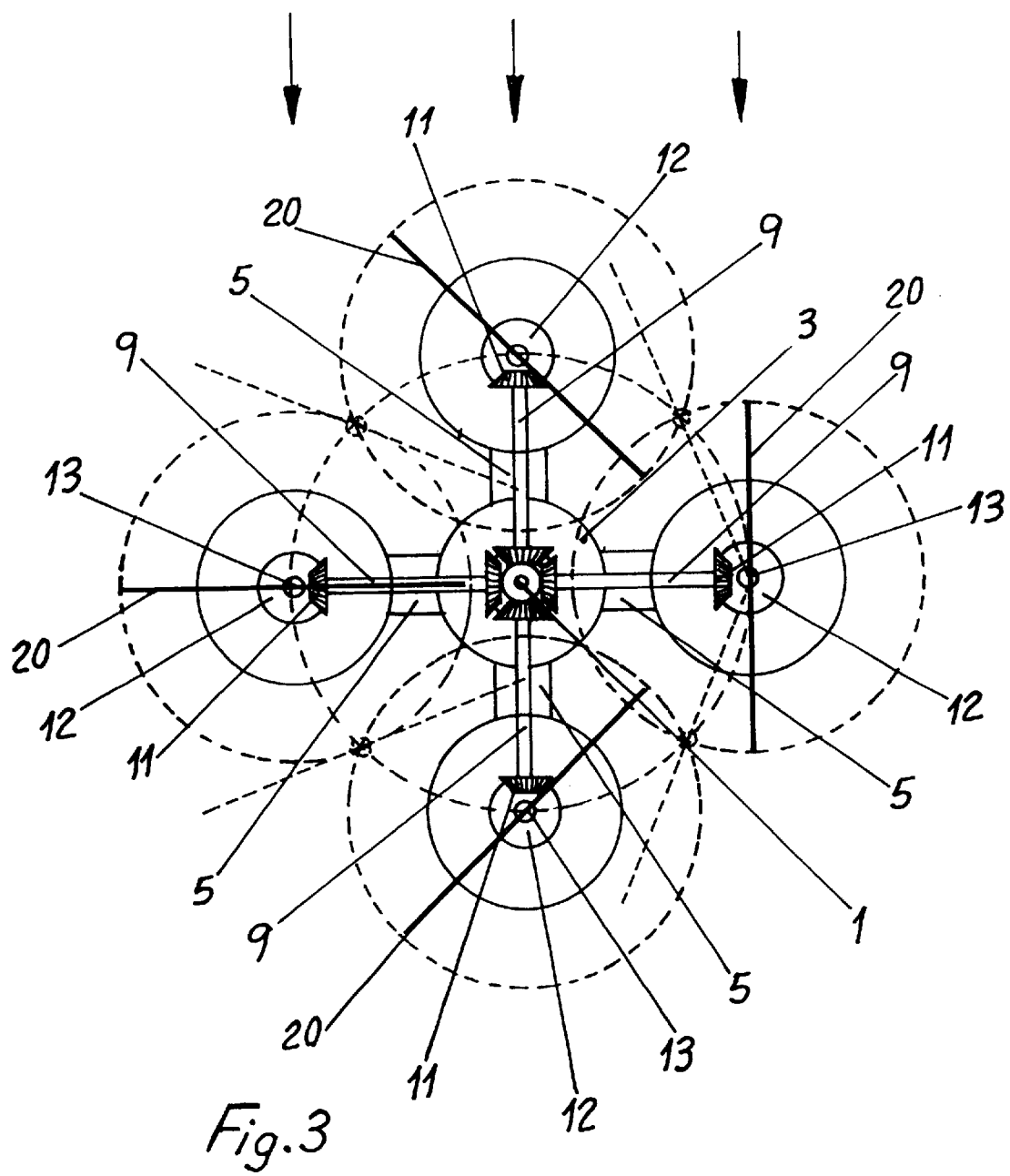

FIG. 3. Conventional view as a schematic representation of the wind power generator, showing the arrangement of four triangular blades and their positioning, driven by the direction of the wind, representing the double groups of triangular blades by means of solid lines and the same blades in broken lines at the intermediate points of their respective rotating movements.

With reference to the attached drawings, it must be noted that in the different figures shown, numbered reference points have been included which relate to the description of their characteristics and operation given below, thus facilitating their immediate location, with (1) being the vertical positioning shaft on its lower end, assembled through the bearings (2) to the rotating core (3), equipped with the gear (4) or any other means of transmission, in order to convert the force of the rotation into energy, with the core (3) being constituted in the base of an assembly formed by the radial pieces (5) which can vary in number, although four would be the preferable option, with the upper parts of the radial pieces (5) carrying the base (6) which in turn supports the ascending vertical shaft (7), the top of which carries the disk (8), as a guide for the rotating or winding-up movement of the blades in the form of sails, when rotating in reverse.

Inside the radial pieces (5) are the shaft (9), mounted between the bearings (10), with the bevel gears (11) on their two ends, which are connected to the identical bevel gears (12) arranged perpendicularly, in such a way that, the central bevel gear (24) with half of the number of teeth forms an integral part of the lower vertical shaft (1), while the gears (12) situated in connection with the ends of the radial pieces (5) are affixed to the vertical shafts (13) assembled on the block (14), by means of the bearings (22), with the vertical shafts (13) carrying the hinging elements on the top part of the gears (12) in the form of ball joints (15), enabling the upper extension of the ascending shaft (16) a degree of swinging movement, carrying a bearing and crossbar in the form of a crosshead (17), on the ends of which the pulleys (18) are arranged for the fastenings through springs (23) or other elastic or flexible forms for the users (19) of the double blades (20), situated on both sides of the ascending shaft (16), with ties (21) that keep the double blades tightened, as the blades themselves acquire the form of sails capable of winding around the shafts.

The upper extensions of the ascending shaft (16) of all of the triangular blades divided into two halves (20), are fastened at their respective ends by means of ball joints, and are housed by means of small vertical shafts inside the upper disk (8) topping the ascending vertical shaft (7), serving as a guide in the movement of the blades (20) driven by the wind, incorporating a mechanism that, in the event of rotating in the opposite direction, given the 180° turn of the vertical shaft (1), caused by strong winds such as hurricanes or any other adverse weather condition, the double blades (20) in the form of sails, wind themselves around their shafts, thus avoiding breakage or breakdowns, while this winding-up process can be observed in the blades on the right side of FIG. 1 in the attached drawings.

Considering that each and every one of the parts comprising the system for harnessing wind energy with self-protection, to which we have been referring herein, have been extensively described, it only remains for us to note the possibility that its various parts could be manufactured in a variety of materials, sizes and shapes, with the added possibility of introducing in its constitution those variations of a construction nature as may be advisable in light of practical considerations, on the condition that they will not alter the essential points of the invention concerned in this Patent registration.

What is claimed is:

1. System for harnessing wind energy with self-protection, said system comprising
   a vertical positioning shaft having a rotating core made up by several equidistant radial arms, the radial arms housing a shaft with bevel gears on two ends of the arms, the bevel gears on an internal part of the radial arms engaging another bevel gear having half the number of teeth, the bevel gears on the opposite ends of the radial arms being connected to other bevel gears assembled on shafts fitted with bearings, the shafts incorporate a hinging element on an upper part of the shafts for adopting a slight inclination for foldable blades driven by the wind.

2. System for harnessing wind energy with self-protection according to claim 1, wherein the upper part of the shafts having a bearing and a crossbar in the form of a crosshead with the crossbar including a pulley supporting a flexible and elastic tie, the tie is affixed to the blades divided into two halves.

3. System for harnessing wind energy with self-protection according to claim 1, wherein a shaft extending from the crossbar extends and in an ascending direction terminates at a top end in a circular bush.

* * * * *